United States Patent [19]
Duckwall

[11] Patent Number: 5,802,048
[45] Date of Patent: *Sep. 1, 1998

[54] METHOD AND APPARATUS FOR ACCELERATING ARBITRATION IN A SERIAL BUS BY DETECTION OF ACKNOWLEDGE PACKETS

[75] Inventor: William S. Duckwall, Santa Cruz, Calif.

[73] Assignee: Apple Computer, Inc., Cupertino, Calif.

[*] Notice: The term of this patent shall not extend beyond the expiration date of Pat. No. 5,495,481.

[21] Appl. No.: 691,301

[22] Filed: Aug. 1, 1996

Related U.S. Application Data

[63] Continuation of Ser. No. 478,412, Jun. 7, 1995, abandoned, which is a continuation of Ser. No. 316,552, Sep. 30, 1994, Pat. No. 5,495,481.

[51] Int. Cl.$^6$ ............................................. H04J 3/26
[52] U.S. Cl. ..................... 370/389; 370/447; 370/462; 370/471
[58] Field of Search .......................... 370/389, 437, 370/442, 444, 447, 448, 450, 451, 459, 461, 462, 470, 471; 371/33

[56] References Cited

U.S. PATENT DOCUMENTS

| | | | |
|---|---|---|---|
| 4,623,886 | 11/1986 | Livingston | 340/825.5 |
| 4,677,612 | 6/1987 | Olson et al. | 340/825.5 |
| 4,679,193 | 7/1987 | Jensen et al. | 370/94.1 |
| 4,811,277 | 3/1989 | May et al. | 370/471 |
| 4,914,653 | 4/1990 | Bishop et al. | 370/85.6 |
| 4,985,890 | 1/1991 | Matsumoto et al. | 370/94.1 |
| 5,199,051 | 3/1993 | Nakabayashi et al. | 370/470 |

FOREIGN PATENT DOCUMENTS 0481908  4/1992  European Pat. Off. .

OTHER PUBLICATIONS

Patent Abstracts of Japan; 60 117845 (Sharp) Jun. 25, 1985; see abstract.
Patent Abstracts of Japan; 60 117846 (Sharp) Jun. 25, 1985; see abstract.
Patent Abstracts of Japan; 60 194642 (Sharp) Oct. 03, 1985; see abstract.
IEEE Standards Document P1394, "High Performance Serial Bus", Draft 7.1 vol. 1. pp. 105–112.

*Primary Examiner*—Melvin Marcello
*Attorney, Agent, or Firm*—Blakely, Sokoloff, Taylor & Zafman

[57] ABSTRACT

Methods and circuitry for arbitrating for control of a serial bus are described. According to one embodiment, one or more nodes of a serial bus are provided with a mechanism for discriminating between data packets and acknowledge packets. If a packet transmitted, repeated, or received by the node is a data packet, the node remains idle for a subaction gap time $T_{sa}$ to better ensure that the expected acknowledge packet is allowed to successfully propagate throughout the serial bus to the source node. If the packet transmitted by the node is an acknowledge packet, the node is free to begin the arbitration phase of the next subaction if there are no other conditions that prevent further arbitration by that node. To discriminate between data packets and acknowledge packets, a counter is used to determine the length of a transmitted packet, and the length is compared to the expected length of an acknowledge packet. If the length is equal to the expected length of an acknowledge packet, the packet is an acknowledge packet.

13 Claims, 8 Drawing Sheets

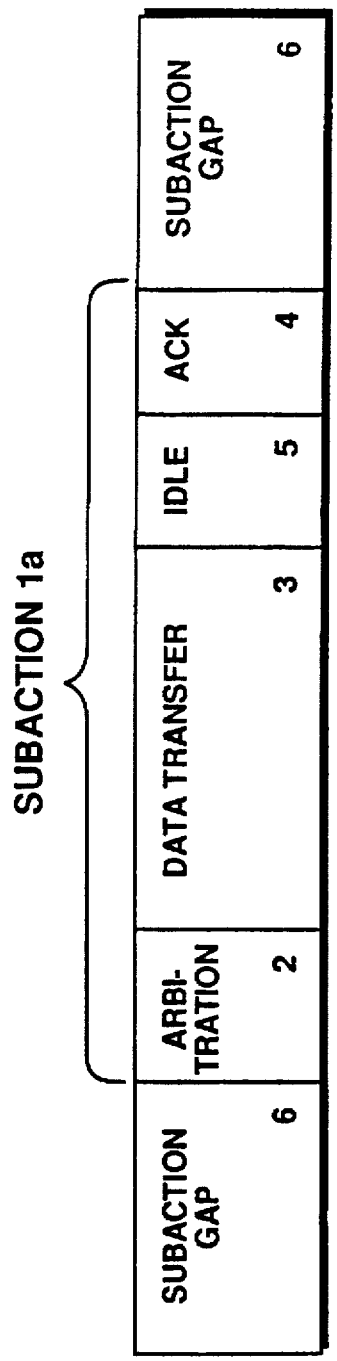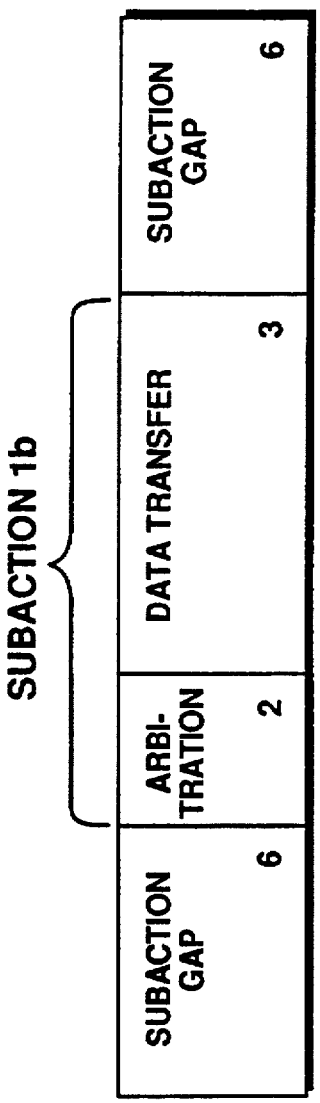
FIG. 1A (PRIOR ART)
FIG. 1B (PRIOR ART)

METHOD AND APPARATUS FOR ACCELERATING ARBITRATION IN A SERIAL BUS BY DETECTION OF ACKNOWLEDGE PACKETS

This is a continuation of application Ser. No. 08/478,412, filed Jun. 7, 1995, now abandoned, which is a continuation of application Ser. No. 08/316,552, filed Sep. 30, 1994 U.S. Pat. No. 5,495,481.

FIELD OF THE INVENTION

This invention relates generally to data communications and more particularly to data communications in a computer bus architecture.

BACKGROUND OF THE INVENTION

The components of a computer system are typically coupled to a common bus for communicating information to one another. Various bus architectures are known in the prior art, and each bus architecture operates according to a communications protocol that defines the manner in which data transfer between components is accomplished.

The Institute of Electrical and Electronic Engineers (IEEE) has promulgated a number of different bus architecture standards, including IEEE Standards Document P1394, entitled *High Performance Serial Bus*, Draft 7.1v1 (hereafter the "P1394 serial bus standard"). A typical serial bus having the P1394 standard architecture is comprised of a multiplicity of nodes that are interconnected via point-to-point links such as cables that each connect a single node of the serial bus to another node of the serial bus. Data packets are propagated throughout the serial bus using a number of point-to-point transactions, wherein a node that receives a packet from another node via a first point-to-point link retransmits the received packet via other point-to-point links. A tree network configuration and associated packet handling protocol ensures that each node receives every packet once. The serial bus of the P1394 serial bus standard may be used as an alternate bus for the parallel backplane bus of the computer system, as a low-cost peripheral bus, or as a bus bridge between architecturally compatible buses.

The communications protocol of the P1394 serial bus standard specifies two primary types of bus accesses: asynchronous access and isochronous access. Asynchronous access may be either "fair" or "cycle-master." Cycle-master access is used by nodes that need the next available opportunity to transfer data. Isochronous access is used by nodes that require guaranteed bandwidth. The transactions for each type of bus access are comprised of at least one "subaction," wherein a subaction is a complete one-way transfer operation.

FIGS. 1A–1C show different subactions according to the P1394 serial bus standard. FIG. 1A shows a subaction for a fair write transaction. FIG. 1B shows a fair broadcast transaction. FIG. 1C shows a pair of concatenated subactions used for fair read and lock transactions. The subaction 1a of FIG. 1A includes an arbitration phase 2, a data transfer phase 3, and an acknowledge phase 4. During the arbitration phase 2, the arbitration protocol determines which of the nodes that have requested fair access to the serial bus will be granted control of the serial bus. The node that is granted control of the serial bus transmits a data packet on the serial bus during the data transfer phase 3. For some fair subactions, an acknowledge packet is used to signal receipt of the data packet, and the acknowledge phase 4 is provided so that a destination node may transmit such an acknowledge packet. To transmit the acknowledge packet, the destination node seizes control of the bus without arbitrating for control of the bus. An idle period 5 occurs between the data transfer phase 3 and the acknowledge phase 4. Acknowledge packets are not required for fair broadcast transactions. Accordingly, FIG. 1B shows asynchronous broadcast subaction 1b, which merely includes the arbitration phase 2 and the data transfer phase 3.

Two subactions are typically required to complete a read or lock transaction; however, separate arbitration phases are not required for each subaction of the transaction. As shown in FIG. 1C, two subactions 1c and 1d are concatenated together such that there is a single arbitration phase followed by a first data transfer phase, a first idle period, a first acknowledge phase, a second data transfer phase, a second idle period, and a second acknowledge phase.

As shown in each of FIGS. 1A–1C a period of idle time called a subaction gap 6 occurs after a subaction or a concatenated pair of subactions. The subaction gaps 6 shown as preceding each of the subactions 1a, 1b, and 1c are the subaction gaps 6 that occur after a previous subaction (not shown). Each subaction gap 6 is a constant amount of time $T_{sa}$ that, according to the P1394 serial bus standard, a node must remain idle before it is allowed to initiate the beginning of the arbitration phase for the next subaction. The subaction gap time $T_{sa}$ is typically set by system software when the serial bus is initialized.

The insertion of a subaction gap 6 between fair subactions is a result of a simple mechanism used by each node of a typical P1394 serial bus to regulate arbitration timing. For asynchronous bus traffic, each node waits for at least a subaction gap after data transfer before requesting control of the bus. This timing is enforced whether the data transferred by a node is a data packet or an acknowledge packet. The duration of the subaction gap 6 is selected to ensure that an acknowledge packet is allowed to propagate through the serial bus to the source node before the nodes begin arbitrating for control of the bus. The subaction gap time $T_{sa}$ is guaranteed to be of adequate duration if it is defined to be greater than a worst-case round-trip delay time $T_{rt}$ of the serial bus to ensure that a possible acknowledge packet is allowed to propagate throughout the serial bus before the nodes begin the arbitration phase of the next subaction. The delay time $T_{rt}$ includes the round-trip propagation delay between the two nodes of the serial bus having the greatest intervening timing delay. The round-trip propagation delay $T_{rt}$ between the nodes is measured from the time that the source node completes transmission of the data packet to the time that the source node begins reception of the acknowledge packet.

The subaction timing of the P1394 serial bus standard is enforced by arbitration logic disposed within the nodes of the serial bus, each of which is in one of the possible states shown in FIG. 2. FIG. 2 shows a simplified state diagram illustrating the state transitions for the arbitration logic that are of interest. The states and transitions of the arbitration state machine are described in more detail at pages 105–112 of the P1394 serial bus standard. FIG. 2 shows idle state A0, request test state A1, request delay state A2, request state A3, grant state A4, receive state A5, and transmit state A6, all of which are labeled according to the conventions of the P1394 serial bus standard. All inactive nodes stay in the idle state A0 until the occurrence of an internal or external event. A node in the request state A3 requests control of the serial bus. A node in the grant state A4 receives a grant signal which gives that node control of the bus so the node may enter transmit state A6 or pass the grant signal on to one of its child nodes. A node in the receive state A5 receives the data transmitted by the node in the transmit state A6. Request test state A1 consumes zero time and merely operates as a convenient point for testing whether a link request is active or not after a timing event. Request delay state A2 marks the start of the request handshake on the serial bus and is a time delay that is inserted to guarantee that all nodes detect the subaction gap or the arbitration reset gap. A more detailed description of the various states may be found in the P1394 serial bus standard.

The state transitions that ensure the subaction gap 6 include A5:A0a, A6:A0, and A0:A1. These transitions are shown in bold. The source node of a data packet goes from the transmit state A6 to the idle state A0 after the end of a data packet. During the A6: A0 transition, the variable idle_time of the source node is reset to a zero value. The variable idle_time for each node is used as a counter to determine the amount of time that node is idle. Nodes that did not win the arbitration phase go from the receive state A5 to the idle state A0 after the received data packet is retransmitted or "repeated." The variable idle_time of a node is also set to zero during the A5:A0a transition.

Once a node goes idle, it remains idle until the next internal or external event. For the fair broadcast subaction 1b, there are typically no further events after the data transfer phase 3, and the nodes remain idle for the subaction gap 6. For the subaction 1a, a node is in the idle state A0 during the idle period 5, but the acknowledge packet is received or transmitted during the acknowledge phase 4 reducing the length of the idle period 5 to less than the subaction gap time $T_{sg}$. During the acknowledge phase 4 of subaction 1a, the destination node goes to the transmit state A6 via the A0:A6 transition so that it may transmit the acknowledge packet. The destination node returns to the idle state A0 via the A6:A0 transition after transmission of the acknowledge packet. The remaining nodes go to the receive state A5 via the A0:A5 transition in response to receiving the acknowledge packet. After the acknowledge packet propagates through a node, the node is returned to the idle state A0 via the A5:A0a transition.

A node may enter the request test state A1 if the node has been idle for the subaction gap time $T_{sg}$. Therefore, transition A0:A1a occurs if idle_time is equal to the constant subaction_gap_detect_time, which is defined to be the subaction gap time $T_{sg}$. Transition A0:A1 is the beginning of the arbitration sequence that places a node in the request state A3.

According to the P1394 serial bus standard, each node must remain idle for the subaction gap time after the transmission, repeating, or receipt of a packet before that node is allowed to begin the arbitration phase of the next subaction, regardless of whether the packet is a data packet or an acknowledge packet. However, once an acknowledge packet has been transmitted, repeated, or received, the subaction is complete because acknowledge packets are never themselves "acknowledged" by a second acknowledge packet. Therefore, requiring a node to remain idle for the subaction gap time after the acknowledge phase of a fair subaction is unnecessary and results in the underutilization of bus bandwidth.

SUMMARY OF THE INVENTION

Therefore, a method for discriminating between a data packet and an acknowledge packet is desirable so that the idle time of a bus may be reduced.

A mechanism that allows a node to discriminate between the transmission of a data packet and the transmission of an acknowledge packet is also desirable.

According to a first embodiment, a method for accelerating arbitration for control of a bus is described. A packet is detected on the bus by a first node. A packet may be detected by the first node whether the first node transmits the packet, repeats the packet, or merely receives the packet. The first node determines the length of the packet. The first node compares the length of the packet to a first length. The first length is a predetermined length which may be defined to be equal to the length of an acknowledge packet. If the comparison between the length of the transmitted packet and the first length indicates that the packet is an acknowledge packet, the first node may request control of the bus before a predetermined length of time has elapsed. If the comparison between the length of the transmitted packet and the first length indicates that the packet is a data packet, the first node may request control of the bus after the predetermined length of time has elapsed. The predetermined length of time may be equal to a subaction gap time of the bus.

Other features and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIG. 1A shows an asynchronous subaction according to the IEEE P1394 serial bus standard.

FIG. 1B shows a broadcast subaction according to the IEEE P1394 serial bus standard.

DETAILED DESCRIPTION

As described herein, one or more nodes of a serial bus are provided with a mechanism for discriminating between data packets and acknowledge packets. If a packet transmitted, repeated, or received by the node is a data packet, the node remains idle for the subaction gap time $T_{sg}$ to better ensure that an expected acknowledge packet is allowed to successfully propagate throughout the serial bus to the source node. If the packet transmitted by the node is an acknowledge packet, the node is free to begin the arbitration phase of the next subaction, assuming that there are no other conditions that prevent arbitration by that node. Allowing a node to begin arbitration almost immediately after the transmission, repeating, or receipt of an acknowledge packet accelerates arbitration for the serial bus. Accordingly, nodes that include circuitry for performing methods described herein are called "accelerated arbitration nodes." Although the novel methods and circuitry described herein are described with respect to the IEEE P1394 serial bus standard architecture, the methods and circuitry may be readily adapted to other types of data communications architectures.

Figure 1C:
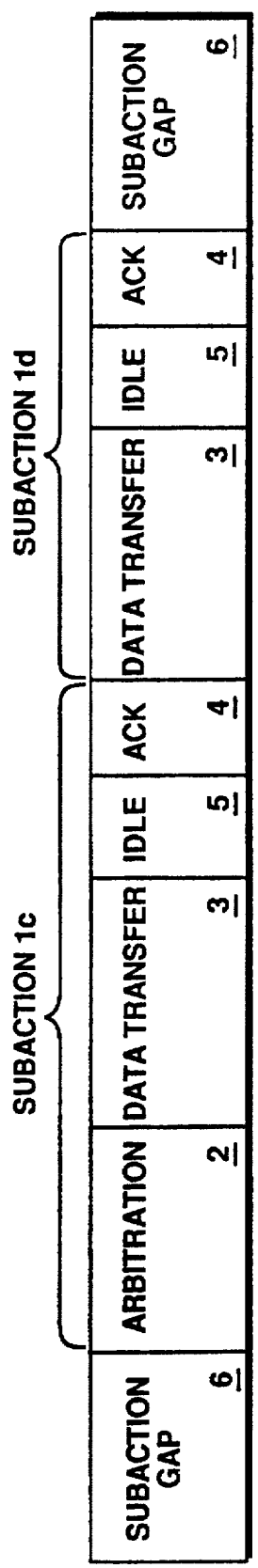
FIG. 1C shows concatenated asynchronous subactions according to the IEEE P1394 serial bus standard.
Figure 2:
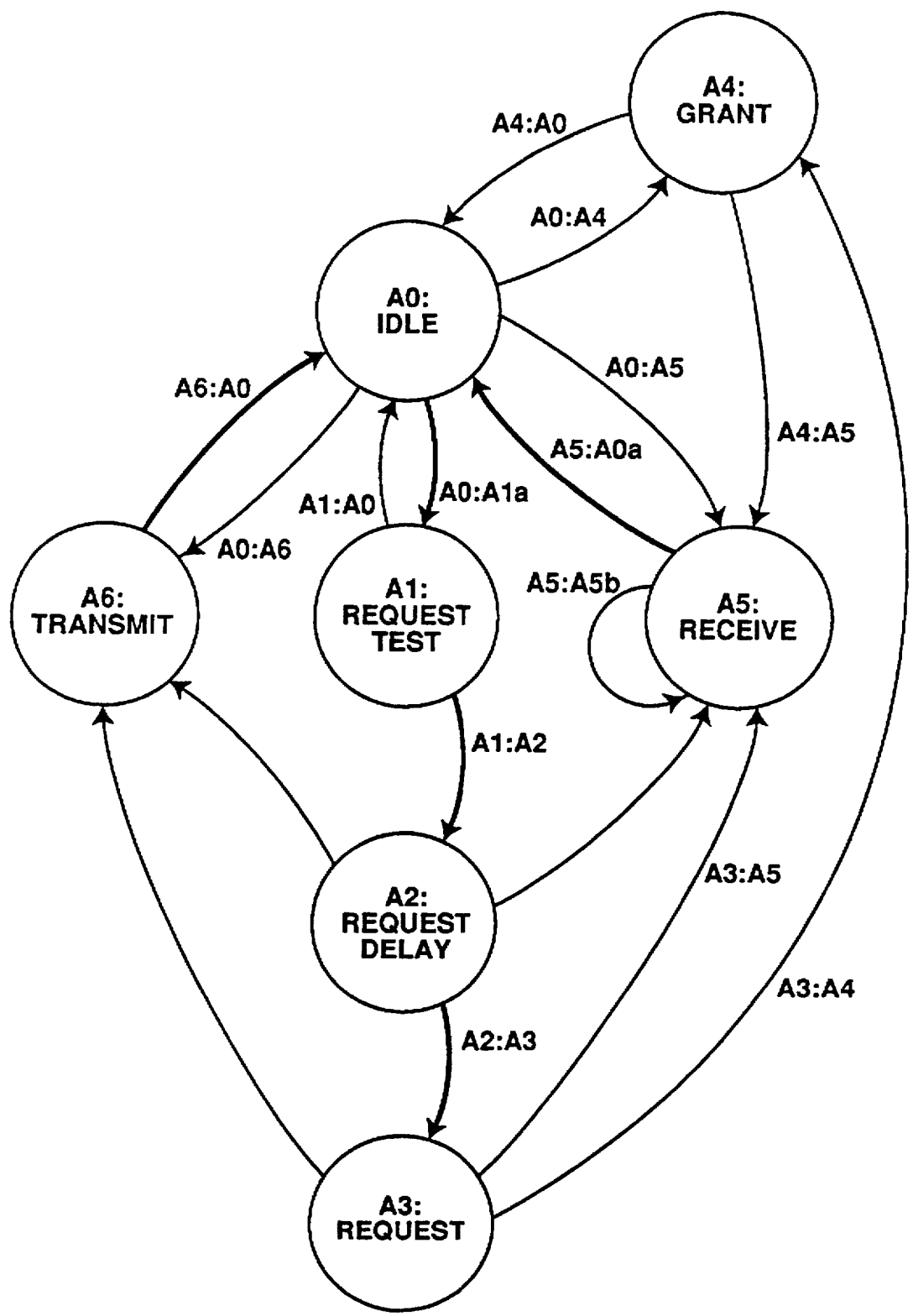
FIG. 2 is a state diagram for the arbitration state logic of a node manufactured according to the IEEE P1394 serial bus standard.
Figure 3:
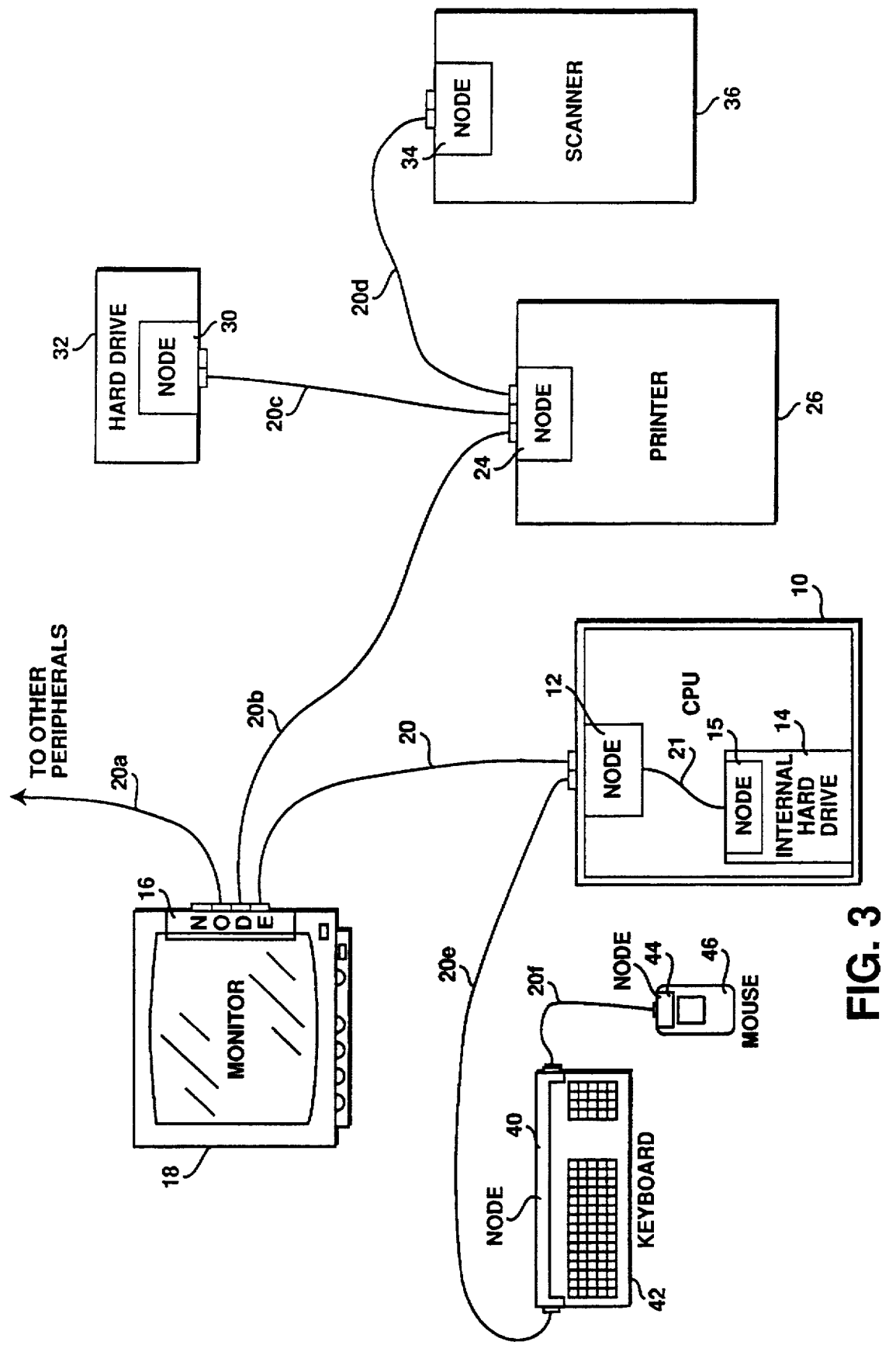
FIG. 3 shows a computer system including accelerated arbitration nodes.

FIG. 3 shows a computer system in which a serial bus including one or more accelerated arbitration nodes is used to transfer data. The serial bus may generally be constructed in accordance with the P1394 serial bus standard.

The computer system of FIG. 3 comprises a central processing unit (CPU) 10, a monitor 18, a printer 26, a hard drive 32, a scanner 36, a keyboard 42, and a mouse 46. The CPU 10 includes an internal hard drive 14. Each of the devices of the computer system is coupled to a node of the serial bus. In general, the device to which a node is coupled acts as the "local host" for that node. For example, the CPU 10 is the local host for the CPU node 12; the monitor 18 is the local host for the monitor node 16; the printer 26 is the local host for node 24; the hard drive 32 is the local host for the hard drive node 30; the scanner 36 is the local host for the scanner node 34; the keyboard 42 is the local host for keyboard node 40; the mouse 46 is the local host for mouse node 44; and the internal hard drive 14 is the local host for the internal hard drive node 15. It is not necessary for every node to have a local host, nor is it necessary that the local host always be powered.

A point-to-point link such as cable 20 is used to connect two nodes to one another. The CPU node 12 is coupled to internal hard drive node 15 by an internal link 21, to monitor node 16 by a cable 20, and to keyboard node 40 by a cable 20e. The keyboard node 40 is also coupled to the mouse node 44 by a cable 20f. The monitor node 16 is coupled to the nodes of other peripherals (not shown) by cable 20a and to the printer node 24 by cable 20b. The printer node 24 is coupled to the hard drive node 30 by cable 20c and to the scanner node 34 by the cable 20d. Each of the cables 20–20f and the internal link 21 may be constructed in accordance with P1394 serial bus standard and includes a first differential signal pair for conducting a first signal, a second differential signal pair for conducting a second signal, and a pair of power lines.

Each of the nodes 12, 15, 16, 24, 32, 34, 40, and 44 is an accelerated arbitration node that includes circuitry for accelerating arbitration as described below. Each of the nodes may have identical construction, although some of the nodes, such as the mouse node 44, can be simplified because of their specific functions. Thus, the nodes can be modified to meet the needs of the particular local host. For example, each node has one or more ports, the number of which is dependent upon its needs. For example, the CPU port 12 as illustrated has three ports, while the mouse node 44 has only one port.

Standard nodes that use the arbitration state machine according to the P1394 serial bus standard may be included in a serial bus that also includes accelerated arbitration nodes. Standard nodes and accelerated arbitration nodes may operate together without any special modifications to the circuitry or arbitration state logic of either type of node.

The serial bus of the computer system may be adapted for use in different types of electronic systems. For example, the serial bus may be used to interconnect the components of an audio/video electronics system wherein the local hosts may include a video camera, a video recorder, a video monitor, and an audio amplifier.

Figure 4:
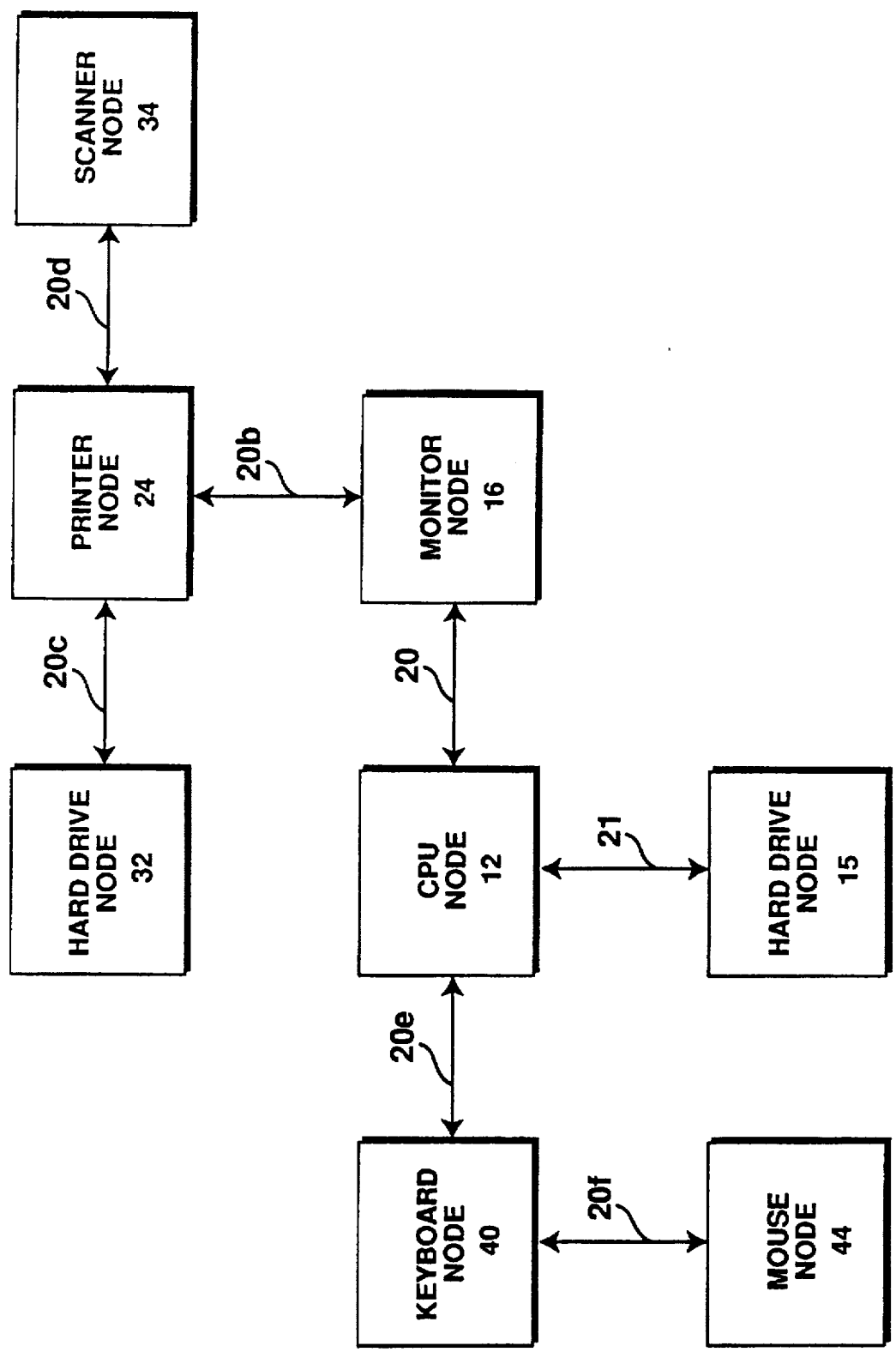
FIG. 4 shows a serial bus including accelerated arbitration nodes.

FIG. 4 is a simplified representation of the computer network of FIG. 3 that more clearly shows the serial bus and the nodes coupled to the serial bus. Each of the accelerated arbitration nodes 12, 15, 16, 24, 32, 34, 40, and 44 are shown as blocks that are interconnected by cables. Although each cable typically only provides for point-to-point communication between two nodes, the architecture of the node and the communications protocol of the serial bus are such that information communicated by one node to another node is propagated throughout the entire serial bus by the nodes. For example, if mouse node 44 sends a data packet to node CPU node 12, the data packet is first transmitted by the mouse node 44 to the keyboard node 40. The keyboard node 40 retransmits the data packet to the CPU node 12, which retransmits the data packet to the hard drive node 15 and the monitor node 16, even though the data packet has arrived at its destination. The data packet is received and retransmitted until each of the nodes has received the data packet.

To reduce the amount of idle time after a fair subaction to be less than the subaction gap time $T_{sa}$, each of the accelerated arbitration nodes includes circuitry for discriminating between data packets and acknowledge packets. This circuitry is shown in more detail in FIG. 7.

If a node determines that an acknowledge packet has been transmitted, repeated, or received, that node need not remain idle for the subaction gap time $T_{sa}$ and may begin arbitration immediately. The time that an accelerated arbitration node remains idle after transmitting, repeating, or receiving an acknowledge packet may vary from zero to some time less than the subaction gap time $T_{sa}$. The idle time of a particular node may be a function of both the arbitration timing of that node and the position of the node on the serial bus.

To discriminate between acknowledge packets and data packets, the length of a transmitted, repeated, or received packet is compared to the expected length of an acknowledge packet. According to the P1394 serial bus standard, acknowledge packets are eight bits long, wherein data packets are at least sixty-four bits long. Wherein the serial bus of the computer system is constructed in accordance with the P1394 serial bus standard, an accelerated arbitration node may count the number of bits in a transmitted packet and compare the counted number of bits to a predetermined number to discriminate between data packets and acknowledge packets. For one embodiment, if the counted number of bits for a packet is equal to eight, the node identifies that an acknowledge packet has been transmitted and immediately begins the arbitration phase of the next subaction. For another embodiment, if the counted number of bits for a packet is less than sixty-four bits, the node identifies that a data packet has not been successfully transmitted and immediately begins the arbitration phase of the next subaction.

Figure 5:
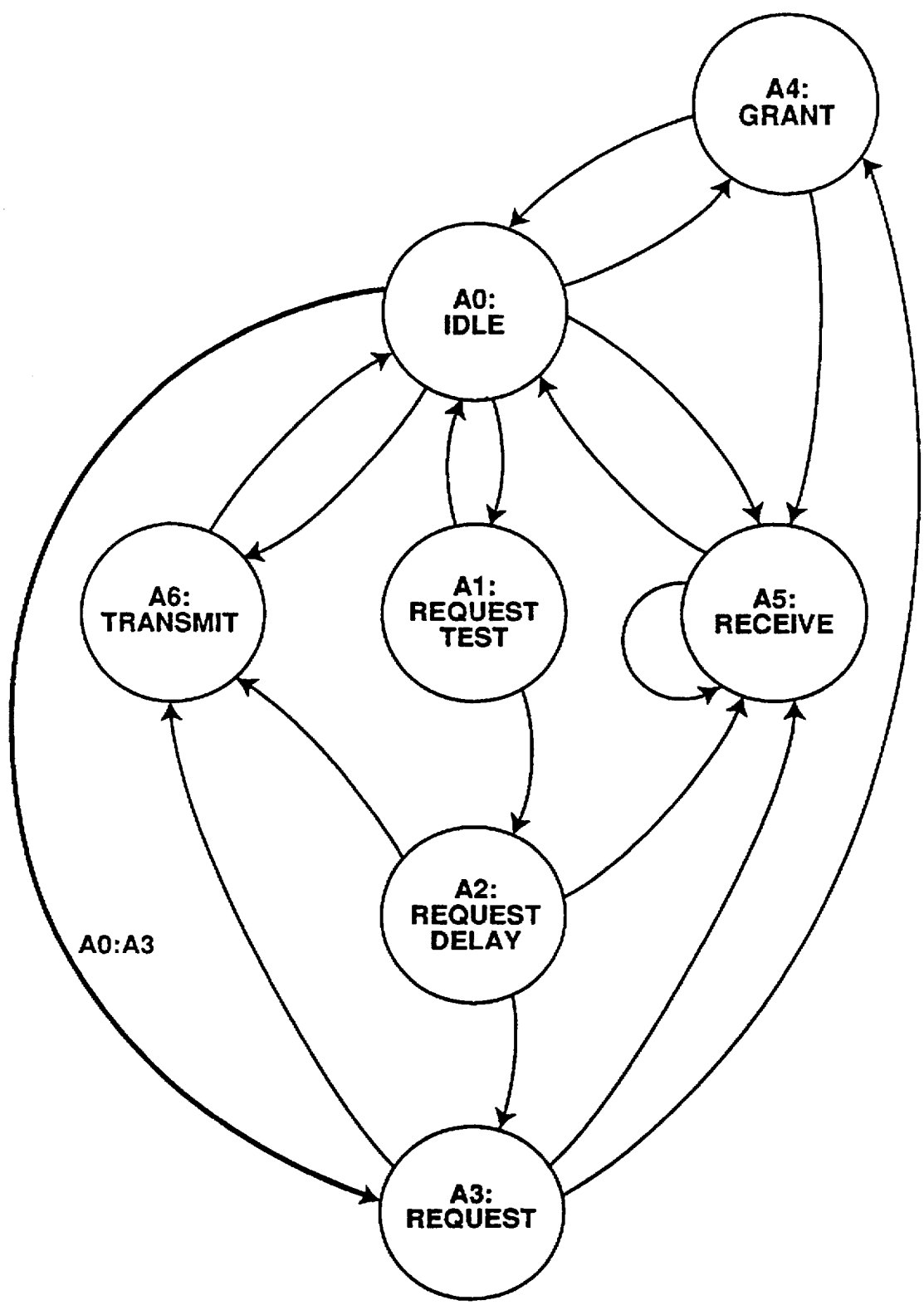
FIG. 5 shows a state diagram for an accelerated arbitration node.

FIG. 5 is a state diagram for the arbitration state machine of an accelerated arbitration node constructed to operate in a P1394 serial bus. As shown, the arbitration state machine of an accelerated arbitration node includes a transition A0:A3, which is in addition to the state transitions described by the P1394 serial bus standard. Transition A0: A3 allows an accelerated arbitration node to transition from the idle state A0 to the request state A3 before idle_time is equal to the subaction gap time $T_{sa}$ if the last transmitted, repeated, or received packet is determined to be an acknowledge packet. The term "detected" as used herein contemplates detection through the transmission, repeating, or reception of an acknowledge packet. For example, a node that has only one port typically does not repeat a received acknowledge packet and possibly may not transmit an acknowledge packet; however, the receipt of the acknowledge packet is sufficient to allow detection of the acknowledge packet and to therefore enable accelerated arbitration by the single-port node.

Upon the completion of transmitting, receiving, or repeating an acknowledge packet, an accelerated arbitration node returns to the idle state A0. The accelerated arbitration node may begin arbitration substantially immediately upon detecting that the last transferred packet is an acknowledge packet. The amount of time that an arbitrating accelerated arbitration node remains idle after the detection of an acknowledge packet is determined by the arbitration logic of the arbitrating accelerated arbitration node. For example, the arbitration logic of one embodiment requires an arbitrating accelerated arbitration node to remain idle for two bus clock cycles after detection of an acknowledge packet before the arbitrating accelerated arbitration node requests control of the serial bus. The idle time for this embodiment is in the order of several nanoseconds wherein the subaction gap time for even the smallest of serial buses is typically in the order of one or more microseconds.

According to one embodiment, transition A0:A3 occurs if the following conditions are met:

idle_time≦subaction_gap_detect time && (cycle_master_request || (fair_request && arb_enable)) && last_packet_ack.

If the accelerated arbitration node has queued a permissible fair request or cycle-start request, and if the last packet on the bus was an acknowledge packet, and if the bus idle time was less than or equal to the subaction gap time $T_{sa}$, then the accelerated arbitration node may immediately begin bus arbitration. The variable last_packet_ack is a Boolean quantity that is set to a logical 1 if the packet is an acknowledge packet and to logical 0 if the packet is not an acknowledge packet. As shown, the request test state A1 and the request delay state A2 may be bypassed.

Figure 6:
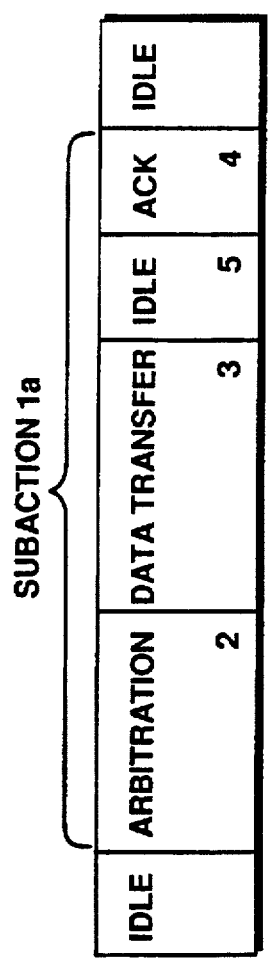
FIG. 6 shows a fair subaction for an accelerated arbitration node.

FIG. 6 shows the timing of subactions for an accelerated arbitration node. As shown, no subaction gap is inserted before or after the subaction 1; however, an accelerated arbitration node may be idle for some nonzero time after detecting an acknowledge packet and the end a fair subaction. The amount of time that a particular accelerated arbitration node will remain idle after the transmission, repeating, or receipt of an acknowledge packet is determined in part by whether that accelerated arbitration node itself requests control of the serial bus. If an accelerated arbitration node is the arbitrating node, the amount of idle time is typically set by the arbitration logic of the accelerated arbitration node and may be defined to be zero. If the accelerated arbitration node is not the arbitrating node, the amount of idle time may vary as a function of that accelerated arbitration node's position on the serial bus relative to the destination node that sent the acknowledge packet and the node that began arbitration, and as a function of the exact time that the arbitrating accelerated arbitration node began arbitration.

The reduction of bus idle time through the elimination of forced constant subaction gaps between fair subactions does not affect the timing and occurrence of arbitration reset gaps, and the fairness protocol of the serial bus may be maintained. For a mixed serial bus that includes both standard nodes and accelerated arbitration nodes the accelerated arbitration nodes may tend to be granted control of the serial bus before standard nodes are granted control, but each node is still ensured the opportunity to send one packet during the fairness interval. For subactions that include a data transfer phase and no acknowledge phase, the above-described scheme of discriminating between data packets and acknowledge packets enforces the insertion of a subaction gap after the transfer of a data packet.

Because the subaction gap time is related to the worst-case round-trip time $T_{rt}$, the benefit of eliminating the subaction gaps between asynchronous subactions increases as the size of a serial bus increases. For example, the subaction gap time of a fifteen node serial bus may be approximately 5 µs, while the transmission time of a 128 byte data packet may be approximately 10 µs at a 100 Mb/s data transfer rate. The insertion of 5 µs subaction gaps thus substantially decreases the bandwidth of the serial bus. The elimination of subaction gaps for fair subactions reduces the bus idle time and allows some of the unused bandwidth to be regained.

Figure 7:
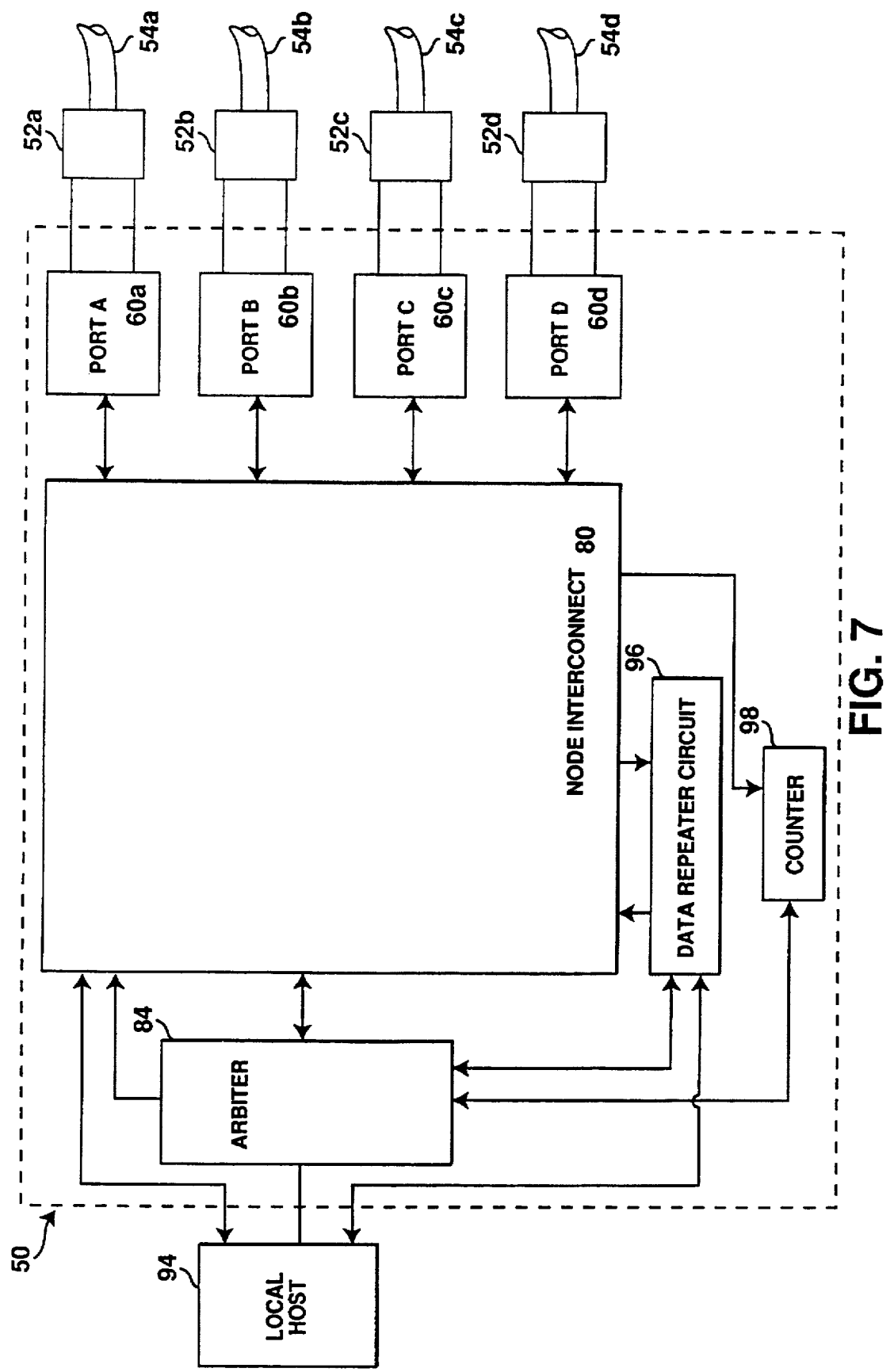
FIG. 7 shows an accelerated arbitration node according to one embodiment.

Now that the overall operation of the serial bus and accelerated arbitration nodes has been discussed, reference is made to FIG. 7 which is a block diagram of an accelerated arbitration node 50. The accelerated arbitration node 50 is shown as including ports 60a–60d, node interconnect 80, arbiter 84, data repeater circuit 96, and counter 98. A plurality of sockets 52a–52d are provided to receive connector cables 54a–54d. The sockets 52, the connector cables 54, the ports 60, the node interconnect 80, and the data repeater circuit 96 may be constructed in accordance with the P1394 serial bus standard and with the teachings of U.S. patent application Ser. No. 08/004,431, entitled *Communication Node with a First Configuration for Arbitration and a Second Configuration for Data Transfer*, and commonly assigned to Apple Computer, Inc., of Cupertino, Calif. now U.S. Pat. No. 5,579,486. Patent application Ser. No. 08/004,431 is incorporated by reference herein.

Each port 60 includes a pair of transceivers (not shown) for transmitting and receiving data from the connector cables of the serial bus, and the node interconnect 80 is configurable to transmit and receive data simultaneously. The local host 94 is coupled to the node interconnect 80 for transmitting and receiving packets on the serial bus via the ports 60. The data repeater circuit 96 is coupled to the node interconnect 80 and provides for data received from one of the ports 60 to be transmitted on other of the ports 60 via the node interconnect 80. The arbiter 84 is coupled to control operation of the node interconnect 80 and includes logic circuitry for enforcing the arbitration protocol of the accelerated arbitration node 50. The local host 94 is also coupled to the arbiter 84 and the data repeater circuit 96 of the accelerated arbitration node 50.

A counter 98 is coupled to the arbiter 84 and the node interconnect 80. The counter 98 is used to count the number of bits of a packet transmitted, repeated, or received by the node 50 via the node interconnect 80. The arbiter 84 checks the contents of the counter 98 after a packet is detected by the node 50. The output of the counter 98 is compared by the arbiter 84 to the expected length of an acknowledge packet to determine if the detected packet is a data packet or an acknowledge packet. Alternatively, the output of the counter 98 may be compared by the arbiter 84 to the minimum length of a data packet. The result of the comparison may be output as the Boolean quantity last_packet_ack, which is used by the arbiter 84 to determine if the A0:A3 state transition is to occur. The counter 98 is initialized between the transmission or repeating of packets.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. In an electronics system including a bus, a method for discriminating between packets of a first type and packets of a second type, the method comprising the steps of:
   detecting a packet on a bus by a first node;
   determining a length of the packet; and
   identifying whether the packet is of the first type or the second type based on the length of the packet, wherein the first node performs a first action if the packet is of the first type and performs a second action if the packet is of the second type.

2. The method of claim 1, wherein the method further comprises the step of the first node initially receiving the packet from a second node via the bus.

3. The method of claim 1, wherein the method further comprises the steps of:
   initially requesting control of the bus by the first node to transmit the packet; and
   granting control of the bus to the first node such that the first node may transmit the packet on the bus.

4. The method of claim 1, wherein the step of identifying whether the packet is of the first type or the second type comprises comparing the length of the packet to a first length.

5. The method of claim 4, wherein comparing the length of the packet to the first length indicates that the packet is a first type of packet if the length of the packet is equal to the first length.

6. The method of claim 4, wherein comparing the length of the packet to the first length indicates that the packet is a first type of packet if the length of the packet is less than the first length.

7. In an electronics system including a serial bus, a method for discriminating between packets of a first type and packets of a second type, the method comprising the steps of:
   detecting a packet on the serial bus by a node;
   determining a length of the packet by the node;
   identifying whether the packet is of the first type or the second type based on the length of the packet, wherein the node performs a first action if the packet is of the first type and performs a second action if the packet is of the second type.

8. The method of claim 7, wherein the step of identifying whether the packet is of the first type or the second type comprises comparing the length of the packet to a first length.

9. The method of claim 8, wherein comparing the length of the packet to the first length indicates that the packet is a first type of packet if the length of the packet is equal to the first length.

10. The method of claim 8, wherein comparing the length of the packet to the first length indicates that the packet is a first type of packet if the length of the packet is less than the first length.

11. In a bus having a plurality of nodes, a node comprising:
    at least one port coupled to transmit and receive data on the bus;
    a node interconnect coupled to the port, the node interconnect being operative to transfer packets between the port and a local host of the node;
    a counter coupled to the node interconnect, the counter being operative to determine a length of a packet transmitted via the node interconnect; and
    a circuit coupled to the counter and the node interconnect, the circuit being operative to identify whether the packet is of a first type or a second type based on the length of the packet, the circuit further being operative to initiate a first response by the node if the packet is determined to be of the first type and to initiate a second response by the node if the packet is determined to be of the second type.

12. A serial bus comprising:
    a plurality of nodes;
    a plurality of point-to-point links, wherein each point-to-point link is coupled between two nodes in a manner such that each node is coupled to every other node via one or more point-to-point links,
    wherein at least one node of the plurality of nodes comprises:
       at least one port coupled to a point-to-point link and operative to transmit and receive data via the point-to-point link;
       a node interconnect coupled to the port, the node interconnect being operative to transfer packets between the port and a local host;
       a counter coupled to the node interconnect, the counter being operative to determine a length of a packet transmitted on the serial bus via the node interconnect;
       an circuit coupled to the counter and the node interconnect, the circuit being operative to determine whether the packet is of a first type or of a second type based on the length of the packet, the circuit further being operative to initiate a first response by the node if the packet is determined to be of the first type and to initiate a second response by the node if the packet is determined to be of the second type.

13. In an electronics system including a bus, a method for discriminating between packets of a first type and packets of a second type, the method comprising the steps of:
    detecting a packet on a bus by a first node;
    measuring a length of the packet; and
    identifying whether the packet is of the first type or the second type based on the length of the packet, wherein the first node performs a first action if the packet is of the first type and performs a second action if the packet is of the second type.

* * * * *